Dec. 5, 1972   T. KUGLER   3,705,006

METHOD FOR CARRYING OUT HIGH TEMPERATURE REACTIONS

Filed Sept. 1, 1970

Inventor:
TIBOR KUGLER
BY Brady, O'Boyle & Gates
ATTORNEYS

United States Patent Office 3,705,006
Patented Dec. 5, 1972

3,705,006
METHOD FOR CARRYING OUT HIGH
TEMPERATURE REACTIONS
Tibor Kugler, Sins, Switzerland, assignor to Lonza, Ltd.,
Gampel/Valais, Switzerland
Filed Sept. 1, 1970, Ser. No. 68,628
Claims priority, application Switzerland, Sept. 4, 1969,
13,378/69
Int. Cl. C01g 1/00, 23/04
U.S. Cl. 423—659     3 Claims

ABSTRACT OF THE DISCLOSURE

The invention is concerned with a method and device for carrying out high temperature reactions which take place with a supply of energy which produces the temperature required for the reaction to take place. The reaction is carried out in a two-part reaction chamber with the reaction components flowing in opposite directions to a separation gap, and the reaction products are chilled and removed at the separation gap by means of a flow component forced into a direction perpendicular to the axis of the reaction chamber.

---

Figure 1:
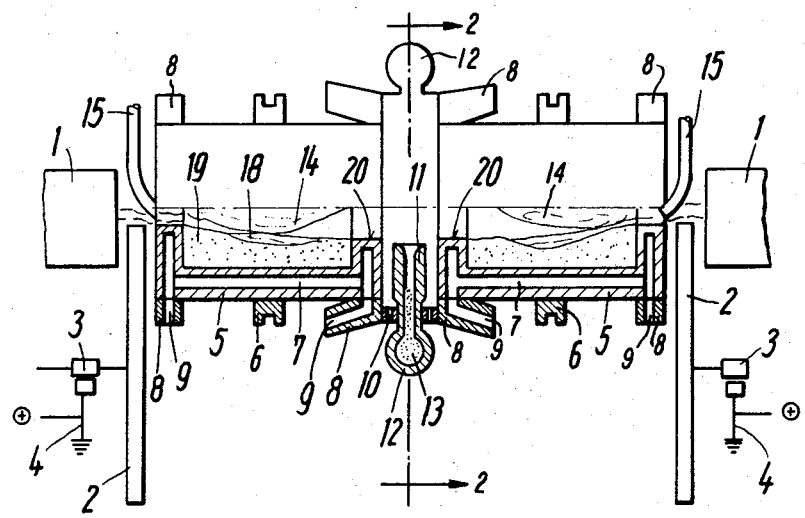

This invention relates to a method and device for carrying out high temperature reactions which take place with a supply of energy, wherein the temperature needed for the reaction is produced by the supplied energy, and the reaction products are chilled.

It is known in the prior art to carry out high temperature reactions, e.g. dissociations or the formation of refractory compounds in a stream of hot gas or plasma. The procedure is usually one wherein the reaction to which energy is supplied by the stream is carried out in a reaction vessel which preferably rotates. The walls of the reaction vessel can be cooled so that a part of the reactants or the end product "freezes" on the walls and forms a protective lining. This produces better thermal insulation and improved protection for the walls against chemical action. These reaction vessels are formed so that the energy source and the reaction components are fed in at one side largely in an axial direction. On the other side the end product is chilled and withdrawn axially. The exit aperture is usually larger than the inlet aperture for the energy source and the reaction components. Chilling is aided by shortening the mixing path between the reaction products and the chilling medium, which is usually introduced radially as a gas or liquid. For a given necessary chilling rate the output level is thus limited. In addition the loss of energy by radiation through the outlet aperature is relatively high with these known methods.

A high temperature method is also known from United States patent specification No. 3,275,412, with an apparatus consisting of plasma torches inclined to one another at an angle of 70–120°. In this patent specification it is stated that with plasma torches inclined to one another at an angle of 180°, such heavy deposits of solidified titanium dioxide were formed within 62 hours in front of the centrally disposed separation gap that the reaction had to be discontinued. This is considered specially disturbing, since with the higher degree of mixing of the reaction components by virtue of the strong interaction of the plasma streams at angles above 160°, a greater yield can be achieved.

The present invention aims to remove these known disadvantages. Accordingly, the present invention provides a method for carrying out high temperature reactions which take place with a supply of energy which provides temperature required for the reaction, comprising carrying out the reaction in a two-part reaction chamber with the reaction components flowing in opposite directions to a separation gap, and chilling and removing reaction products at said separation gap by means of a flow component forced into the separation gap in a direction perpendicular to the axis of said reaction chamber.

The energy needed for the reaction can be supplied in the form of a heated gas stream or plasma stream from a plasma generator, or by the application of an electromagnetic field. Preferably the energy is supplied with the aid of plasma streams. In a particularly effective embodiment, plasma (or gas) streams are supplied in opposite directions at each end of the reaction vessel. The plasma streams, reactants and reaction products flowing in opposite directions impinge on each other, are radially deflected, and are removed from the separation gap.

The position of the separation gap depends on the amounts supplied. If both sides are supplied equally, the separation gap is located in the middle of the vessel.

In a particularly suitable embodiment the reaction vessel is rotatably mounted and rotates during the reaction.

The reaction vessel walls are preferably cooled sufficiently for a wall coating of at least one of the reactants to be formed on the inside surfaces. Under the influence of the added energy from plasma streams, part of the wall coating is brought into the reactive condition and supplied to the reaction by evaporation by the heat of the plasma streams. It is consequently desirable for reactants to be continuously supplied from the exterior, in order to renew constantly the wall coating. For chilling and removing the reaction products the preferred procedure is to introduce the chilling medium into both parts of the reaction vessel in the immediate vicinity of the separation gap and to remove it together with the reaction product through said gap. The chilling medium (gas, liquid etc.) is preferably inserted so that it flows in as close as possible to the annular inner end walls of the treatment vessel, and is removed through the separation gap without flowing far into the reaction chambers. The period of mixing is thus very short and the chilling very intensive; radiation losses are small.

The device for carrying out the method provided by the invention consists of a two-part reaction vessel with feed means for the reactants and the energy source, a separation gap between the two parts of the reaction vessel, inlets for the chilling medium in the immediate vicinity of the separation gap, and a collector channel disposed about the separation gap for the chilled reaction product.

EXAMPLE

Figure 2:
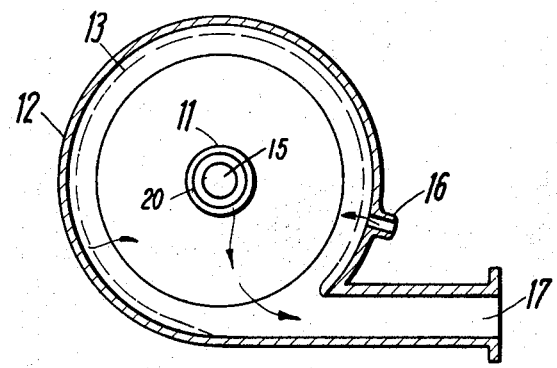

One embodiment of the invention is shown in FIG. 1 which is a schematic side elevation view, partly in longitudinal section, of a rotary reaction vessel with associated plasma generator for carrying out the process of the invention; and FIG. 2 is a cross-section view through the reaction vessel in the plane of the separation gap, the view being taken substantially on line 2—2 of FIG. 1. A rotary reaction vessel having a pair of coaxial reaction chambers 5 with hollow cooled walls, and driven by the drive wheels 6, from a source not shown, is divided by the stationary separation gap 11. Baffle-plates 20 form the annular end walls of the chambers adjacent the separation gap and are provided for retaining the reaction material in the chambers 5. The high temperature energy for carrying out the high temperature treatment is introduced by the oppositely flowing plasma streams 14 from the plasma generator 1. The reactants or additional reaction components are fed through the tubes 15 into the plasma streams, and are therefore blown in opposite directions toward each other into the respective coaxial chambers 5 by the streams 14. The plasma streams are produced in known manner in the plasma generators 1 with rotating anodes 2 and stream feeders 3; the chemical composition of the starting materials for the plasma streams can be selected within wide limits by the use of suitable plasma generators, depending on the reaction conditions. Part of the reactants e.g. oxide powder in the case of the vaporisation of oxides, collects from the plasma streams on the rotating internal walls of the chambers 5 and forms a cladding 19 at whose smaller inside diameter the oxide in the layer 18 melts and evaporates under the high temperature of the plasma streams 14. The cooling medium for cooling the hollow walls 7 of the coaxial reaction chambers enters and leaves the hollow wall spaces 7 via inlet and outlet apertures 9 formed between sealing rings 8. The inlets 10 for the introduction of the chilling medium are disposed between the baffles 20 and are in the form of inlet apertures 10. The outlet 11 (centrifugal nozzle) into the annular collector channel 12 is positioned between the annular end walls 20 between the inlet apertures 10 for chilling medium. The chilling medium enters the separation gap through apertures 10 at right angles to the axis of the treatment chambers 5, flows toward the center of the separation gap close to annular end walls 20, chills the evaporated oxides collected in the separation gap from both plasma streams 14, and flows with the chilled reaction products into outlet 11 which removes the chilling medium and reaction products from the separation gap through collector channel 12. Thus, the reaction products are insert-collected and withdrawn through the separation gap by the outlet 11 after chilling. A sieve base 13 may be effectively disposed in the annular collector channel 12 around the separation gap. Gas for preventing adhesion of the chilled products or precipitate can be fed under the sieve base 13 through the opening 16. The suspension of reaction products thus leaves the device through the outlet connecting pipe 17 of the collector channel.

I claim:
1. A method for high temperature treatment of oxide powders, comprising collecting the oxides on rotating internal walls of two coaxial chambers, thereby cladding the internal walls with coatings of the oxides, directing two plasma streams toward each other in opposite directions, each coaxially into one of the chambers, melting the oxides at the inside of the coatings with the plasma jets and simultaneously heat evaporating the melted oxides, collecting the evaporated oxides from the two plasma streams at a separation space between the two chambers, chilling the collected evaporated oxides in said separation space, and withdrawing the chilled product from said separation space.

2. A method for high temperature treatment of oxide powders as set forth in claim 1, including feeding a chilling medium into the separation space in the immediate vicinity of each of said coaxial chambers.

3. A method for high temperature treatment of oxide powders as set forth in claim 2, wherein the chilled product is removed from the separation space in the withdrawing step together with chilling medium.

References Cited
UNITED STATES PATENTS

| | | | |
|---|---|---|---|
| 3,275,412 | 9/1966 | Skrivan | 23—202 V |
| 3,443,897 | 5/1969 | Wilson | 23—1 R X |

EDWARD STERN, Primary Examiner

U.S. Cl. X.R.

23—294; 423—611